Jan. 21, 1964   E. C. BISHOP ET AL   3,118,568
MEASURING COLORANT DISPENSER
Filed Feb. 20, 1961   2 Sheets-Sheet 1
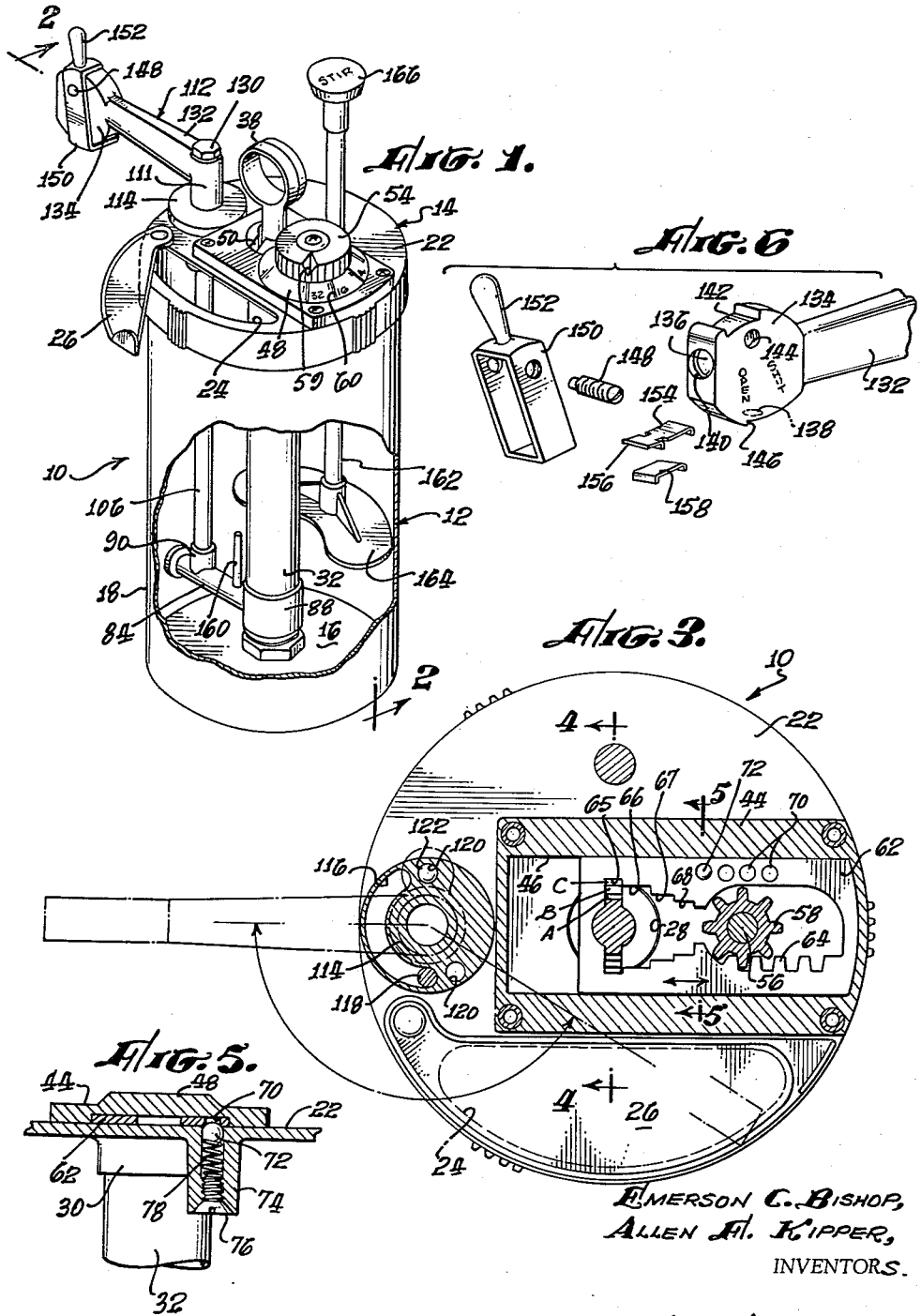
EMERSON C. BISHOP,
ALLEN M. KIPPER,
INVENTORS.
BY THEIR ATTORNEYS.
HARRIS, KIECH, RUSSELL & KERN.

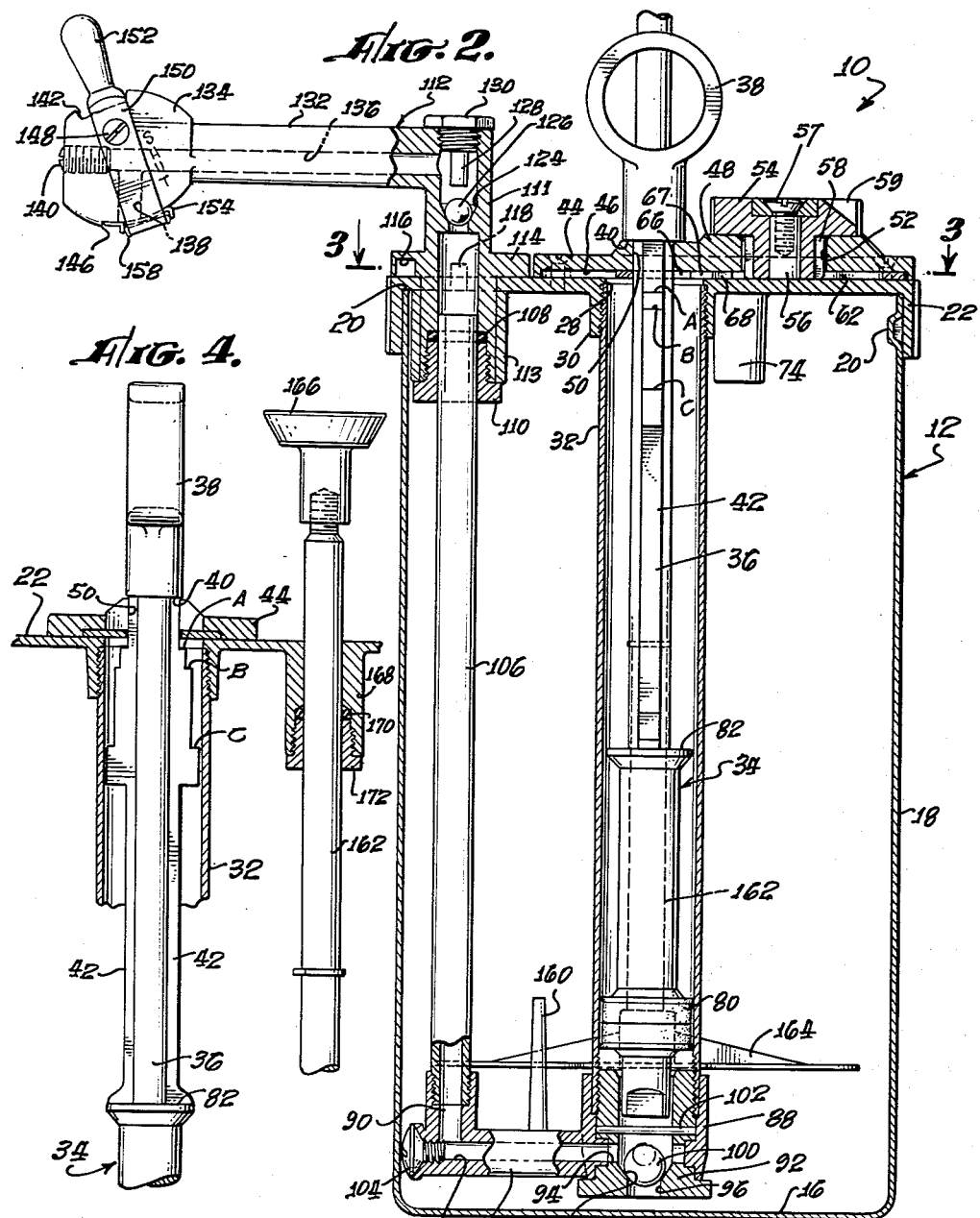

United States Patent Office 3,118,568
Patented Jan. 21, 1964

3,118,568
MEASURING COLORANT DISPENSER
Emerson C. Bishop, South Pasadena, and Allen F. Kipper, Glendale, Calif., assignors to Devoe & Raynolds Company, Inc., Louisville, Ky., a corporation of New York
Filed Feb. 20, 1961, Ser. No. 90,452
5 Claims. (Cl. 222—43)

The present invention relates generally to the paint and color-formulating art and more particularly to a novel measuring colorant dispenser for use in compounding paints and the like of selected colors and shades.

Briefly stated, one embodiment of the present invention includes a canister for holding a volume of fluid, said canister containing a discharge spout. A pump assembly including a piston rod is mounted on the canister for forcing fluid from it to be discharged from the spout. Control means are associated with the piston rod for selectively adjusting the stroke thereof whereby the amount of fluid discharged from the spout at each stroke of the rod is automatically predetermined, the control means also including an indicating member which shows the position of the control and the amount of fluid which will be discharged with each stroke of the piston rod.

As is well known in the art, many customers who purchase paint and other colorant material desire not only a particular color but also a specific shade of the color in order to match the color of existing furniture, draperies, or the like. The desired color or shade of color is usually selected from a "chip" and the colored paint is mixed or compounded using a white or neutral base to which is added part or all of the contents of one or more metal "tubes" of fluid pigment or colorant material. This system has many disadvantages. For one, it is messy because it is necessary to roll or squeeze the soft metal tubes in order to eject the colorant material or fluid pigment therefrom. Furthermore, it is relatively inaccurate and shades of colors cannot be exactly duplicated because a different amount of pigment or colorant material will be ejected from different tubes even though they are of the same size because the amount ejected is dependent upon how conscientiously and energetically the salesman works in completely emptying the contents of the tube or tubes. In addition, the number of colors and shades of colors which can be produced by this method are quite limited because of the size of the tubes, and if less than a full tube is used, it is virtually impossible to exactly duplicate the shade of the color.

It is an object of the present invention, therefore, to provide a novel measuring colorant dispenser for ejecting or making available predetermined measured amounts of fluid colorant materials for use with a body of neutral colored paint. More particularly, it is an object to provide such a dispenser which automatically and accurately measures out an amount of colorant material which is predetermined by the operator. Specifically, it is an object to provide such a dispenser which will accurately eject the exact amount of colorant material selected by the operator by the setting of a control in any one of a number of positions, as for example, to eject as little as $\frac{1}{32}$ of an ounce or as much as one ounce or more.

An additional object is to provide positive means for accurately controlling the amount of colorant material which is dispensed from the device.

Another object is to provide a novel measuring colorant dispenser which includes means for recirculating the colorant material during the priming operation and to avoid settling or coagulation.

A further object is to provide such a dispenser which includes pumping means which remains fully primed so that a measured amount of colorant material is always immediately available adjacent the discharge spout or outlet.

Yet another object is to provide a novel measuring colorant dispenser containing a spout or outlet which does not drip or leak.

An additional object is to provide such a dispenser which contains a simple and inexpensive means for indicating the level at which the dispenser should be recharged with colorant material.

A further object is to provide a novel measuring colorant dispenser which is of rugged construction and which will operate for many years with a minimum amount of maintenance.

Further objects and advantages of the present invention will be apparent from the following detailed description, reference being had to the accompanying drawings wherein a preferred embodiment of the present invention is shown.

In the drawings:

FIG. 1 is a perspective view of a measuring colorant dispenser constructed in accordance with the teachings of the present invention, a portion of the canister being cut away to disclose the internal construction of the device;

FIG. 2 is an enlarged vertical sectional view taken on the line 2—2 in FIG. 1;

FIG. 3 is a horizontal sectional view taken on the line 3—3 in FIG. 2;

FIG. 4 is a fragmentary vertical sectional view taken on the line 4—4 in FIG. 3;

FIG. 5 is a fragmentary vertical sectional view taken on the line 5—5 in FIG. 3; and FIG. 6 is an exploded perspective view of the discharge head of the spout.

Referring to the drawings more particularly by reference numerals, 10 indicates a novel measuring colorant dispenser embodying the teachings of the present invention, which includes a canister 12 and a dispensing assembly 14.

The canister 12 is cup-like in shape with a bottom wall 16, and a side wall 18 which terminates in an upper edge 20. The dispenser is preferably made from drawn aluminum but other suitable materials can be used.

The dispensing assembly 14 is removably mounted on the upper edge 20 of the canister and includes a closure member or screw-on lid 22 provided with an elongated filling opening 24 adjacent one edge thereof which is closed by means of a pivotally mounted cover 26.

Adjacent the center of the lid 22 is a circular opening 28 surrounded by a depending internally threaded nipple 30. An elongated depending tubular member or pump cylinder 32 is threaded in said nipple and extends downwardly to adjacent the bottom wall 16 of the canister. Mounted in the tubular member 32 is a piston assembly 34 including a piston rod 36 which extends above the lid 22 and which has an operating handle or grip ring 38 on the upper end thereof which is provided with a lower shoulder 40 for a purpose to appear.

As shown in FIGS. 2 and 4, the piston rod 36 has diametrically opposed axially extending ribs 42, each of which, in the present embodiment, is provided with three vertically spaced stroke-limiting steps or shoulders which are identified by the letters A, B and C. Removably mounted on the upper surface of the lid 22 is a cover plate 44 (FIG. 2) which contains a rectangular recess 46 (FIG. 3) in the bottom surface thereof. A protuberance 48 extends above the top surface of the cover plate and contains a slot 50 adjacent one end thereof for receiving the piston rod 36. Adjacent the other end of the protuberance is a circular opening 52 which receives a knurled measuring knob 54 which is rotatably mounted on a pin 56 formed integral with the lid 22 and which is maintained in position by means of a screw 57. As shown in FIGS. 2 and 3, the lower portion of the knob 54 comprises a pinion gear 58. As also shown in FIG. 1, the knob 54 contains an indexing groove or notch 59 which co-operates with volume settings 60 marked on the protuberance adjacent thereto.

Mounted beneath the cover plate 44 in the recess 46 is a plate-like dog member 62 which contains an opening at one end thereof with a rack of gear teeth 64 to mesh with the pinion gear 58 of the knob 54. The other end of the dog member contains a stepped opening which, in effect, provides a series of four closely spaced slots of different lengths which are related to the widths of the shoulders A, B and C previously described. These slots are identified by the numbers 65, 66, 67 and 68. As best shown in FIG. 3, slot 65 is long enough to permit the passage of all of the shoulders including the widest shoulder 6; slot 66 will permit the passage of shoulders A and B but not C; slot 67 will permit the passage of shoulder A but not B; and slot 68 prevents the passage of shoulder A. Thus, it will be apparent that by rotating the knob 54 one can move the dog member 62 back and forth, and, by matching the grooves with the shoulders on the piston rod 36, limit the distance the latter can be withdrawn from the pump cylinder 32 prior to the downward or ejecting stroke thereof. To maintain the dog member 62 in any selected position, it is provided with four aligned spaced openings 70 (FIG. 3) which are in vertical alignment with a ball detent 72 (FIG. 5) contained in a short depending tubular member 74 formed integral with the lid 22. The bottom of the tubular member 74 is closed by means of a screw 76 which also engages a coiled spring 78 positioned to urge the ball detent 72 upwardly into one of the spaced openings 70. The openings 70, the slots 65 through 68, and the volume settings 60 are correlated so that when the knob 54 is turned with the notch 59 in alignment with one of the volume settings 60, the corresponding slot will be in alignment with one of the shoulders on the piston rod 36 and the dog member 62 will be releasably maintained in the selected position by reason of the detent ball 72 held in position in one of the openings 70 by the spring 78.

Returning to a consideration of the piston assembly 34, the lower end of the piston rod 36 contains a piston 80 and an upper shoulder or stop member 82 between the piston and the upper end of the rod. Mounted on the lower end of the pump cylinder 32 is a U-shaped tubular member 84 (FIG. 2) which contains a horizontal passageway 86 which interconnects a vertically extending tubular valve housing 88 on the right and an upstanding discharge outlet 90 on the left. The lower end of the pump cylinder 32 which extends into the valve housing 88 is internally threaded and receives the upper end of a hollow plug-like valve member 92 which contains transverse openings 94 in communication with the passageway 86 and an inlet 96 which forms an upwardly facing valve seat 98. A ball valve 100 is positioned within the valve member for cooperation with the valve seat and is limited in its upward movement by a transversely extending limit rod 102. The passageway 86 is closed at the left by means of a screw 104.

Extending upwardly from the discharge outlet 90 (FIG. 2) is a discharge tube 106, the upper end thereof being received in an O-ring 108 positioned between a packing nut 110 and the tubular hub or lower end 111 of an L-shaped discharge spout 112 which is pivotally mounted in a depending tubular support 113 formed integral with the lid 22. The aforementioned hub contains a flange 114 which rides on the upper surface of the lid 22 whereby the spout can be pivoted between an operative position in which it extends away from the canister (FIG. 1) and a priming or recirculating position in which the discharge end thereof is in vertical alignment with the filling opening 24. The under side of said flange contains an arcuate groove 116 (FIGS. 2 and 3) which receives an upstanding pin 118 which limits the pivotal movement of the spout between the two aforementioned positions. The under side of the flange 114 also contains two recesses 120, one adjacent each end of the groove 116, for receiving a ball detent 122 which is similar in construction to the detent 72 previously described and shown in FIG. 5. In short, the groove 116 and the pin 118 limit the movement of the spout and the recesses 120 and ball detent 122 releasably maintain the spout in either selected position. As shown in FIG. 2, the tubular hub 111 contains an upwardly facing valve seat 124 and a ball valve 126, the upward movement of the latter being limited by a pin 128 formed on a screw member 130. The spout also includes a horizontally extending arm 132 which terminates in a discharge head 134. A passageway 136 extends through said arm from the hub 118 and through the head 134, and includes a vertically extending branch discharge passageway 138. The left-hand end of the passageway 136 (FIG. 2) is closed by means of a screw 140.

As shown in FIG. 6, the discharge head 134 is plate-like in form with upper and lower edges and contains a groove 142 in the upper edge. A transversely extending opening 144 is provided below said groove and a shoulder 146 is formed in the lower edge adjacent the branch discharge passageway 138. A pin 148 extends through the opening 144 and pivotally supports a rectangular cut-off lever 150 which includes an upwardly extending knob 152. The upper portion of the lever 150 is positioned in the groove 142 which limits the movement of the lever between a "shut" position in which it closes off the passageway 138 and an "open" position in which it is positioned away from said passageway. In order to quickly and efficiently stop the flow of colorant material from the passageway 138, the lower portion of the lever 150 which extends transversely of the head receives a blade member 154 which has an edge 156 and which is held against the lower edge of the head 134 by a spring member 158. As shown in FIG. 2, the edge 156 engages the shoulder 146 when the lever 158 is in the "shut" position. It will also be understood that when the lever 150 is moved from the "open" position to the "shut" position, the blade member 154 sweeps or cuts across the lower edge and the passageway 138 so as to effectively cut off the flow of colorant material therefrom and thereby prevent any dripping.

Referring to FIGS. 1 and 2, it will be noted that the tubular U-shaped member 84 contains an upstanding pin-like gage member 160 which can be viewed through the filling opening 24, whereby when the upper tip of said member 160 projects above the upper surface of the colorant material in the canister 12, the operator knows that it is time to refill the canister.

The lid 22 also receives a longitudinally movable stirring rod 162 (FIGS. 1 and 4) which contains an arcuate paddle 164 on the lower end and an operating knob 166 on the upper end thereof. The rod 162 extends through a sleeve 168 which includes an O-ring 170 and a packing nut 172 (FIG. 4).

In operation, the canister 12 is first filled with the selected fluid colorant material either by pouring it through the filling opening 24 or by removing the lid 22 and the dispensing assembly. With the dispensing assembly mounted on the canister, the cover 26 is opened to expose the filling opening 24 and the discharge spout 112 is pivoted to the priming or recirculating position with the discharge passageway positioned over said filling opening, and the cut-off lever 150 pivoted to the "open" position.

The measuring knob 54 is rotated to align the indexing notch 59 with the one-ounce marking on the volume setting 60 and the piston rod 36 is moved up and down with short strokes by the operator grasping the operating handle or grip ring 38. This pumping is continued with the strokes being gradually increased until they are at full length, and until a uniform flow of colorant material, free of air, is established. The cut-off lever 150 is then moved to the "shut" position, the spout 112 pivoted to the operative position shown in FIG. 1, and the cover 26 closed over the filling opening 24. The dispenser is thereby primed and ready for operation, and need never be reprimed if the colorant material is maintained above the top of the rod-like refill indicator 160.

Referring to FIG. 2, it will be noted that when the piston rod 36 is moved upwardly a vacuum is produced below the piston 80 in the pump cylinder 32 whereby the ball valve 100 is lifted off its seat 98 and the fluid colorant material flows through the inlet 96 into the lower portion of the pump cylinder 32. When the piston rod 36 is moved downwardly, the pressure on the colorant material in the pump cylinder 32 causes the ball valve 100 to seat and thereby close off the inlet 96. The colorant material then flows through the horizontal passageway 86, up through the discharge tube 106 unseating the ball valve 126 and out through the passage 136 in the spout 112 to be discharged from the discharge passageway 138. However, as soon as the flow of colorant material through the discharge tube 106 ceases, the ball valve 126 in the discharge spout 112 drops onto its seat 124 and thereby maintains the discharge tube 106 and the passageway 86 filled with colorant material. This is the primed condition previously mentioned.

Assuming that it is desired to dispense 1/16 of an ounce of colorant material, the measuring knob 54 is rotated to bring the indexing groove or notch 59 into alignment with the marking 1/16 ounce on the volume setting 60. The rotation of this knob causes the pinion gear 58 (FIG. 3) to move the dog member 62 in the transverse direction and bring the slot 67 into vertical alignment with the slot 50 and the piston rod 36. Consequently, when the operator grasps the grip ring 38 and moves the piston rod 36 in the upper direction, it will move upwardly until the opposed shoulders B on the piston rod contact the dog member 62. Obviously, this length of stroke determines the volume of colorant material admitted into the lower portion of the pump cylinder 32 so that when the piston rod 36 is moved downwardly until the shoulder 40 of the grip ring 38 contacts the upper surface of the protuberant portion 48, this measured amount of colorant material will be discharged from the spout 112. Thus, by moving the dog member 62 back and forth to position a larger or smaller slot in alignment with the opposed shoulders on the piston rod, any selected amount of colorant material can be dispensed from the device. It will be noted that when the dog member 62 is moved to the position shown in FIG. 3, the largest slot 65 is in alignment with the piston rod 36 and all of the opposed shoulders will freely pass through the slot 50 until the large circular shoulder 82 engages the lower surface of the dog member. As previously mentioned, the openings 70 and the ball detent 72 releasably maintain the dog member 62 in any of the selected discharge positions. Furthermore, the groove 116 in the under side of the flange 114 together with the pin 118 limits the movement of the spout 112 between the discharge position and the recirculating or priming position, and the recesses 120 and the ball detent 122 releasably maintain it in either of these positions.

Turning to a consideration of the discharge head 134, the groove 142 limits the movement of the cut-off lever 150 and when the latter is moved from the "open" to the "shut" position, the edge 156 of the blade member 154 cuts across the discharge opening 138 until it engages the shoulder 146. Inasmuch as the spring member 158 maintains the aforementioned blade member against the bottom edge of the discharge head 134, the discharge passageway 138 is tightly sealed when the lever 150 is in the "shut" position.

Thus, it is apparent that there has been provided a novel measuring colorant dispenser which fulfills all of the objects and advantages sought therefor. It is to be understood that the foregoing description and the accompanying drawings have been given only by way of illustration and example and that changes and alterations in the present disclosure which will be readily apparent to one skilled in the art are contemplated as within the scope of the present invention.

We claim:

1. A measuring dispenser comprising: a canister for receiving a volume of fluid; closure means for said canister having a spout; a pump assembly including a piston rod mounted on the closure means for forcing fluid from said canister to be discharged from the spout, said piston rod being mounted for longitudinal movement and containing a group of spaced, outwardly extending shoulders, the width of said shoulders progressively increasing from one end of the group to the other end thereof; a plate-like dog mounted on the closure means for transverse movement relative to the piston rod and containing a plurality of stepped shoulders for selective engagement with the shoulders on the piston rod to limit the stroke thereof; and a knob-like control in driving engagement with the dog for adjusting the position thereof, said control containing indicia showing the amount of fluid to be discharged at each stroke of the piston rod for each setting of the control and the dog.

2. A measuring dispenser comprising: a canister for receiving a volume of fluid; closure means for said canister having a spout; a pump assembly including a piston rod mounted on the closure means for forcing fluid from said canister to be discharged from the spout, said piston rod being mounted for longitudinal movement and containing a group of spaced, outwardly extending shoulders, the width of said shoulders progressively increasing from one end of the group to the other end thereof; a plate-like dog mounted on the closure means for transverse movement relative to the piston rod and containing a plurality of stepped shoulders for selective engagement with the shoulders on the piston rod to limit the stroke thereof; a knob-like control in driving engagement with the dog for adjusting the position thereof, said control containing indicia showing the amount of fluid to be discharged at each stroke of the piston rod for each setting of the control and the dog; and detent means in engagement with the dog releasably maintaining it in adjusted position.

3. A measuring dispenser comprising: a canister for receiving a volume of fluid; closure means for said canister having a spout; a pump assembly including a piston rod mounted on the closure means for forcing fluid from said canister to be discharged from the spout, said piston rod being mounted for longitudinal movement and containing two opposed groups of spaced, outwardly extending shoulders; a plate-like dog supported on the closure means for transverse movement relative to the piston rod, said dog containing two opposed series of stepped shoulders for selective engagement with the shoulders on the piston rod to limit the stroke thereof, and a gear tooth rack; and a knob-like control rotatably mounted on the closure means and including a pinion gear in driving engagement with the rack on the dog.

4. The measuring dispenser set forth in claim 3 in which the control contains indicia showing the amount of fluid to be discharged at each stroke of the piston rod for each setting of the control and the dog.

5. A measuring dispenser comprising: a canister for receiving a volume of fluid having an open upper end and a bottom wall; removable closure means mounted on the upper end of the canister, said closure means having a filling aperture; an elongated spout with a discharge end pivotally mounted on the closure means and movable between an operative position in which it extends away from the canister and a priming position in which the discharge end is positioned over the filling aperture; detent means releasably maintaining the spout in the discharge position and the priming position; a pump assembly mounted on said closure means and including a pump cylinder with a lower end extending into said canister; a piston and piston rod mounted in the pump cylinder for longitudinal movement relative thereto; a first one-way valve adjacent the lower end of the pump cylinder for admitting fluid from the canister into the pump cylinder and preventing the reverse flow thereof; a discharge conduit interconnecting the spout with the lower end of the pump cylinder above the first one-way valve; a second one-way valve in the conduit adjacent the spout permitting the flow of fluid to said spout and preventing the reverse flow thereof; and control means associated with the piston rod for selectively adjusting the stroke thereof for automatically determining the amount of fluid discharged from the spout at each stroke of the piston rod.

References Cited in the file of this patent

UNITED STATES PATENTS

| | | |
|---|---|---|
| 167,601 | Aldrich | Sept. 14, 1875 |
| 409,023 | De Witt | Aug. 13, 1889 |
| 1,297,865 | Kirkwood | Mar. 18, 1919 |
| 1,330,987 | Runyen | Feb. 17, 1920 |
| 1,384,941 | Dilley | July 19, 1921 |
| 1,891,280 | Hazlett et al. | Dec. 20, 1932 |
| 1,979,428 | Wheeler | Nov. 6, 1934 |
| 2,044,866 | Williams et al. | June 23, 1936 |
| 2,205,875 | Coffey et al. | June 25, 1940 |
| 2,846,123 | Gray | Aug. 5, 1958 |
| 2,880,914 | Lerner et al. | Apr. 7, 1959 |
| 2,985,339 | Fischer et al. | May 23, 1961 |